United States Patent
Grenier et al.

(10) Patent No.: US 10,878,329 B1
(45) Date of Patent: Dec. 29, 2020

(54) PROBABILISTIC ACCUMULATION APPROACH TO ASSESS PRIMARY UNCERTAINTY IN CATASTROPHE MODELS

(71) Applicant: Liberty Mutual Insurance Company, Boston, MA (US)

(72) Inventors: Roger Grenier, Scituate, MA (US); Huy Tran, Roslindale, MA (US)

(73) Assignee: Liberty Mutual Insurance Company, Boston, MA (US)

( * ) Notice: Subject to any disclaimer, the term of this patent is extended or adjusted under 35 U.S.C. 154(b) by 848 days.

(21) Appl. No.: 15/593,455

(22) Filed: May 12, 2017

Related U.S. Application Data

(60) Provisional application No. 62/336,366, filed on May 13, 2016.

(51) Int. Cl.
*G06N 7/00* (2006.01)
*G06F 30/20* (2020.01)

(52) U.S. Cl.
CPC ............. *G06N 7/005* (2013.01); *G06F 30/20* (2020.01)

(58) Field of Classification Search
CPC .................................. G06N 7/05; G06N 7/005
See application file for complete search history.

(56) References Cited

U.S. PATENT DOCUMENTS

| | | | | |
|---|---|---|---|---|
| 8,090,600 B2 * | 1/2012 | Ziade | ..................... | G06Q 40/08 705/4 |
| 8,775,220 B2 * | 7/2014 | Maher | ..................... | G06Q 40/08 705/4 |
| 9,563,725 B2 * | 2/2017 | Joshi | ....................... | G06F 17/18 |

OTHER PUBLICATIONS

Grossi, Patricia. Catastrophe modeling: a new approach to managing risk. vol. 25. Springer Science & Business Media, 2005; pp. 23-42 and 69-91. (Year: 2005).*
Anderson, Richard R. et al.; Pricing Catastrophe Reinsurance With Reinstatement Provisions Using a Catastrophe Model; Casualty Actuarial Society Forum Summer 1998; pp. 1-19. (Year: 1998).*
Chavez-Lopez, G. et al.; Natural Catastrophe Loss modeling: The value of knowing how little you know.; ECEE 2010; 9 pages. (Year: 2010).*
Scheidegger, Anna Paula Galvao et al.; Uncertainty Quantification in Simulation Models: A Proposed Framework and Application Through Case Study; 2018 IEEE; Proceedings of the 2018 Winter Simulation Conference; pp. 1599-1610. (Year: 2018).*

* cited by examiner

*Primary Examiner* — Stanley K. Hill
(74) *Attorney, Agent, or Firm* — Alston & Bird LLP

(57) ABSTRACT

The probabilistic accumulation method is an independent and comprehensive approach for validating third-party catastrophe models. The method starts with a standard technique, namely, a limited scenario accumulation analysis, and extends the approach via a novel sampling methodology to evaluate the third-party models against a significantly larger data set. The sampling approach includes a technique for extending the fixed frequency and severity assumption used by the vendor catastrophe models. The result is a more complete set of loss estimates against which to evaluate the vendor model output.

16 Claims, 7 Drawing Sheets

PROBABILISTIC ACCUMULATION APPROACH TO ASSESS PRIMARY UNCERTAINTY IN CATASTROPHE MODELS

CROSS-REFERENCE TO RELATED APPLICATIONS

This application claims priority to U.S. Provisional Application Ser. No. 62/336,366, filed May 13, 2016, of which the entire contents are hereby incorporated by reference.

BACKGROUND

The systems and methods described herein relate to computer models and, in some examples, relate to computer models built from recorded data sets.

Computer modeling is a complex process that, in many examples, models physical inputs, like forces of stress and load, to generate expected outputs. Computer modeling is a wide-ranging field, but commonly it involves applying computer science to create a mathematical model of an event and testing that model to see if the model predicts correctly the outcome of an event by feeding that model data associated with events that actually occurred and checking whether the output of the model is similar to the actual outcome that was recorded for that event. Once a model is created and tested, engineers and scientists can use the model to predict the outcome of a hypothetical event. Models can be highly sophisticated. For example, models that measure windstorm damage may model the shear force generated by wind speeds of certain velocity acting against a building having a certain exposed surface area, and the response of that building's roof to that shear force. Similarly, computer models that model the spread of a viral disease can model the biological incubation period as it varies with environmental temperature. To create accurate models, scientists and engineers employ data recorded for actual events, such as the rate at which a particular virus has incubated in a population at certain recorded temperatures. As it is unlikely that data will be available for all possible temperatures, the model typically addresses this issue of missing data by extrapolating between or from actual recorded data. These extrapolations are forms of assumptions that build uncertainty into the model. This uncertainty can lead to the model providing an output that is a less reliable prediction of the likely outcome than an engineer or scientist may want. For example, in models of the property damage that may arise due to a severe weather event, such as a hurricane, the model for that possible loss may make assumptions as to the frequency with which an area of the country may be subject to a major hurricane of certain wind speed and duration. The assumed frequency is a source of uncertainty in the model. The types of uncertainty that are associated with events, such as the frequency of the event occurring and the severity of that event, are typically called primary uncertainty. Incorrect assumptions for the frequency of a weather event can lead to incorrectly predicted outcomes. As models are often proprietary and closed software systems, it can be difficult for an engineer or scientist using the model in her or his work to find this source of uncertainty.

Accordingly, there is a need in the art for systems and methods that allow engineers and scientists to understand and assess more fully the reliability and accuracy of certain types of models.

SUMMARY

The systems and methods described herein provide, among other things, a probabilistic accumulation approach to assess an uncertainty within a model and to provide the model's user with a more complete understanding of the likelihood of a predicted outcome. In one embodiment, the systems and methods described herein provide a way to assess the impact of different assumptions that are applied by a model and to test the impact these assumptions have on the operation of the model and the outcome the model produces for a given input. To this end, the systems and methods described herein determine a model outcome over a range of possible events, where these events are the input to the model. For example, the methods may create a range of possible events by varying parameters, such as severity, of known events.

In one such embodiment, the methods may vary a parameter representing the severity of an event by varying the severity of collected historical data of the type normally used as input data for a model. In one such example, the methods may take a database of recorded events, such as flood data, and produce two additional data sets, one that reduces the flood water height by ten percent and one that increases the flood water height by ten percent. In this example, the output of the model may be property damage, and the value of the property damage determined by the model may be based, at least in part, on the height of the flood water. In this example, there are now three input data sets, rather than one, and each has a different severity.

Further, the methods may allow the user to vary a second parameter of an event in order to vary a second model assumption. For example, the user may be able to vary event frequency. For example, the methods allow the user to assume that the annual probability of a flood of a certain height in a particular geographic region, such as southern Florida, is, as an illustrative example only, 2% or 4%. The method applies an automated process that uses the varied inputs to create a distribution of possible outcomes, each of which may be an estimate of property damage or loss. This provides an improvement over the prior art point estimates provided by the existing models and tools. The systems and methods described herein can be applied to many types of models, but for illustration purposes, these systems and methods will be described in relation to catastrophe models used to model damage caused by weather-related events.

In certain embodiments, the systems and methods described herein allow engineers and scientists to quantify the impact of uncertainty in the output from a catastrophe model. These systems and methods allow the user to vary assumptions about event frequency and severity in a model, and then to compute the impact on probability that losses due to events will exceed a certain size. These losses can be, for example, property damage, physical injury to people and animals, financial losses, environmental damage and loss and other types of loss.

To this end, and in certain embodiments, the systems and methods described herein may implement a process by which a plurality, and typically thousands, of exceedance probability (EP) curves can be created. In one embodiment, and as will be known to those of skill in the art, an EP curve is a graph that shows the probability of exceedance of various levels of loss, on either an annual occurrence basis or an annual aggregate basis. Any useful technique for generating EP curves may be employed with the systems and methods described herein. In some cases, an EP curve is generated, ranking losses from highest to lowest based on the largest event loss within each simulated year (the occurrence loss) or based on the sum of all event losses within each simulated year (the aggregate loss). The exceedance probability corresponding to each loss is equal to its rank divided by the number of years in the catalog. Each EP curve may reflect a different assumption made about the frequency and severity of events. In one embodiment, the methods explicitly account for the uncertainty in event frequency. The creation of multiple EP curves, each of which provides a different estimate for the exceedance probability for a specific loss amount, allows an assessment of the uncertainty to develop. Thus, the systems and methods create a distribution of estimates. This distribution of estimates provides an improvement over the point estimate provided by the available tools.

More particularly, the methods can include creating a database of events by categorizing a list of measured meteorological events to associate each measured meteorological event with an event type having a geographic region, an intensity, and a hazard. The method can include generating for a categorized meteorological event a statistical distribution representing a range of probabilities that the categorized meteorological event will occur during a calendar year. The method can include determining a likelihood of an outcome by iteratively sampling events from the database as a function of the event type, with a sample rate for a respective event type being determined as a function of the statistical distribution and associating with each sampled event an outcome value and summing the outcome values to generate an accumulated outcome value across a plurality of sampled events. Accordingly, in such an embodiment, it may be that there are two distributions being applied. A first distribution, such as the Poisson distribution, may be applied to determine the number of events in each year of an n-year catalog. A second distribution may be the event frequency distribution, which determines the probability of each event type given that an event has occurred. Thus, and only as an example, it may be that the result of applying the Poisson distribution is that for the year 508 of the 10,000 year catalog, there are two (2) events predicted. For these two predicted events, the systems and methods may sample using the event frequency distribution to determine which two events will occur. For example, these two events may be a category 2 hurricane in Texas ("TX Cat2") and a category 3 hurricane in Florida ("FL Cat3"). Optionally, the sampling is iterative and optionally each iteration of the catalog generation process involves resampling from both the Poisson distribution, to get a different sequence of events, and the event frequency distribution, to get a different mix of events, for example type, category and region.

In some aspects, the method can include generating a statistical distribution for a categorized event, including analyzing an event model to determine a probability estimate used in the event model to estimate a probability of occurrence of an event type.

In some aspects, the method can include generating an accumulated outcome value that includes summing outcome values across a set of sampled events selected to provide a reliable prediction of the outcome.

In some aspects, the method can include determining a likelihood of an outcome, further comprising iteratively applying the statistical distribution of probability estimates to alter the sample rate for sampling events for a respective event type from the database. In some embodiments, the statistical distribution includes a Poisson distribution.

In some aspects, the method can include the step of generating an exceedance probability curve as a function of the accumulated outcome values. In some embodiments, the method can include matching the exceedance probability curve against an exceedance probability curve generated by a separate event model. In some aspects, the method can include determining, based on matching the exceedance probability curve against the exceedance probability curve generated by the separate event model, an uncertainty, and outputting the uncertainty as an evaluation of the separate event model.

The system can include a database of events by categorizing a list of measured meteorological events to associate each measured meteorological event with an event type having a geographic region, an intensity, and a hazard. The system can include one or more computer systems having access to the database and being configured to generate for a categorized meteorological event a statistical distribution representing a range of probabilities that the categorized meteorological event will occur during a calendar year. The one or more computer systems can further be configured to determine a likelihood of an outcome by iteratively sampling events from the database as a function of the event type, with a sample rate for a respective event type being determined as a function of the statistical distribution and associating with each sampled event an outcome value and summing the outcome values to generate an accumulated outcome value across a plurality of sampled events.

In some aspects, the one or more computer systems can be further configured to include generating a statistical distribution for a categorized event by analyzing an event model to determine a probability estimate used in the event model to estimate a probability of occurrence of an event type.

In some aspects, the one or more computer systems can be further configured to include generating an accumulated outcome value that includes summing outcome values across a set of sampled events selected to provide a prediction of the outcome.

In some aspects, the one or more computer systems can be further configured to include determining a likelihood of an outcome, further comprising iteratively applying the statistical distribution of probability estimates to alter the sample rate for sampling events for a respective event type from the database. In some embodiments, the statistical distribution includes a Poisson distribution.

In some aspects, the one or more computer systems can be further configured to include generating an exceedance probability curve as a function of the accumulated outcome values. In some embodiments, the one or more computer systems can be further configured to include matching the exceedance probability curve against an exceedance probability curve generated by a separate event model. In some embodiments, the one or more computer systems can be further configured determine, based at least on matching the exceedance probability curve against the exceedance probability curve generated by the separate event model, an uncertainty; and output the uncertainty as an evaluation of the separate event model.

BRIEF DESCRIPTION OF THE DRAWINGS

The above and other features of the present disclosure will be more apparent upon consideration of the following detailed description, taken in conjunction with the accompanying drawings in which.

DETAILED DESCRIPTION

Figure 1:
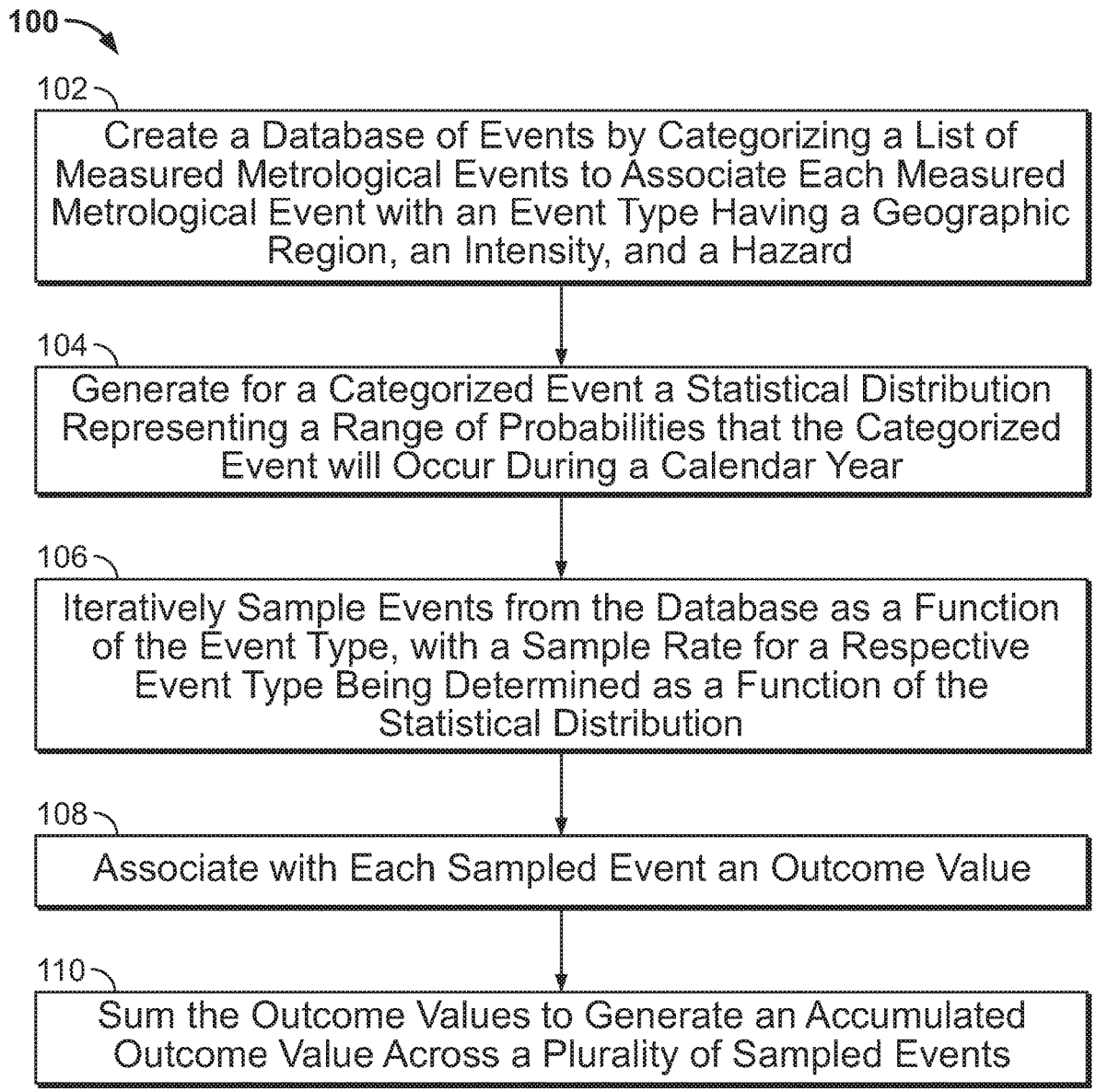
FIG. 1 is a flow chart of illustrated steps involved in determining a likelihood of an outcome in accordance with some embodiments of the disclosure.

To provide an overall understanding of the systems and methods described herein, certain illustrative embodiments will now be described, including a system that assesses uncertainty within a catastrophe model. To this end, in certain embodiments, the systems and methods vary one or more parameters of the input data that are relevant to the output of the model. These variations may be determined probabilistically, thus creating alternate inputs that have a likelihood of occurring and that may be considered as occurring in likely sequences. The systems and methods described herein can present the user with a distribution of probable outcomes. However, it will be understood by one of ordinary skill in the art that the systems and methods described herein can be adapted and modified for other suitable applications and that such other additions and modifications will not depart from the scope hereof.

Thus, the methods described herein include probabilistic accumulation methods that provide, in one embodiment and application, an independent and comprehensive or substantially comprehensive approach for validating third-party catastrophe models. By assessing the model over a range of possible outcomes, the user can determine the range of variation of the model given a varying input data set. The user can determine whether the model is stable over the varying inputs and whether the outputs converge over the varying inputs. These and other assessments can be made by those of skill in the art and provide an approach for validating third-party catastrophe models. A catastrophe model, typically but not always, is a software model that incorporates historical weather data and uses that historical data to form a model that can be used to estimate losses that could be sustained due to a catastrophic weather event such as a hurricane or an earthquake. The catastrophe models are often, but not always, software-coded models that do not expose to review and analysis the algorithms used in that model to estimate a loss. Thus, in some ways, the catastrophe model can be considered a black box that processes input data to create output data, but prevents observation of the processes used by the catastrophe model to calculate the output data from the input data.

The probabilistic accumulation methods described herein, in one illustrative embodiment, start with a standard evaluation technique, such as a limited scenario accumulation analysis, and extend that standard technique via a sampling methodology. This extension allows for evaluating the catastrophe models against a large data set, in many cases a significantly larger data set. In one embodiment, the sampling approach includes a technique for extending the fixed frequency and severity assumption used by the catastrophe models. The result is a more complete set of loss estimates against which to evaluate the catastrophe model output.

For example, insurance and reinsurance companies need an understanding of the potential impact of catastrophic events, such as hurricanes and earthquakes, to ensure their solvency and ability to provide funds for repair and rebuilding. Traditional actuarial techniques that rely on claims history are insufficient for this task, not only because large events are infrequent and the resulting claims are scarce, but also because the exposures are variable. Growth in the number of policies, shifts in the geographic concentrations of risks, and changes in building codes make reliance on prior claims (which is the core of the actuarial analysis) a difficult proposition.

To overcome this lack of reliable historical data, insurers and reinsurers rely on loss estimates derived from sophisticated catastrophe models, of the type developed by a small number of specialist firms and publicly available for sale. These catastrophe model vendors combine elements of science, such as meteorology and seismology, and engineering, such as structural analysis, to build models that can simulate thousands of years of plausible events, each year being a realization of potential losses associated with a year of catastrophe experience.

Typically, as a starting point, the catastrophe modelers use historical data associated with the peril in question. With hurricanes, for example, the modelers use information on hurricane intensity, track and other parameters. However, there is a great deal of uncertainty with the available data. The events themselves are rare and the technology available to measure the parameters has evolved considerably over time. Currently, hurricane data is collected from satellites, while, 100 years ago, hurricane data was collected from ship reports. The modelers are aware of the limitations of such historical data, such as hurricane data collected from past ship reports, and use statistical techniques to smooth and correct the historical event information. These statistical techniques represent a set of assumptions that lie at the core of the model's "catalog" of potential future events. A model's catalog of events contains a list of potential future events, including the severity and frequency of the events, over a period of time. This catalog could be generated by, for example, a simulation of events over a range of years.

Recognizing that the models represent a significant simplification of an enormously complex system, the catastrophe model vendors are aware of the uncertainty inherent in the modeled losses. In fact, modelers refer to "primary" uncertainty and "secondary" uncertainty. Primary uncertainty is the uncertainty in event occurrence due to frequency, severity, location, and other factors. Secondary uncertainty is the uncertainty in the loss given that an event has occurred. Secondary uncertainty is explicitly accounted for in the vendor model calculations such as the financial modeling component, and the vendor modeling platforms include tools to help users assess the impact of the secondary uncertainty. However, these platforms do not include tools to allow users to directly assess the impact of primary uncertainty or the uncertainty in the events themselves.

The event frequency and severity embedded in the model catalog reflects the vendor's assumptions about the rate of occurrence for events of a particular type. The event frequency is the number of events over a certain time period. The severity is the strength of the event, which can include the intensity and hazard associated with it. For example, one can infer from the catalog of events that the vendor assumes that a category 3 hurricane will make landfall in Florida with an annual probability of 8%. This assumption naturally influences the model output, which provides the user with a point estimate of the exceedance probability for a specific loss amount. An example of a point estimate of an exceedance probability for a specific loss amount is a $100 million loss has a 1% annual probability of exceedance. The exceedance probability (EP) curve is the result typically used by those of skill in the art to price and manage the risk.

The systems and methods described herein address the technical problem associated with quantifying the impact of primary uncertainty in the output from a catastrophe model. Specifically, the method, in certain embodiments, allows the user to vary the model assumptions about event frequency and severity, and to compute the impact on probability of exceeding losses of a certain size. Following the example above, the method allows the user to assume that the annual probability of a category 3 hurricane landfall in Florida is 6%, or 10%, or any other credible estimate that might be derived from analysis of the historical record and other scientific information. The method considers an automated process by which thousands of EP curves can be created, each reflecting a different assumption around the frequency and severity of events. The method may account for the uncertainty in event rates and allows the uncertainty to develop in the creation of multiple EP curves, each of which provides a different estimate for the exceedance probability for a specific loss amount. Thus, a distribution of estimates is created, which improves over the point estimate provided by the available tools.

The method may be applied to the example of modeling storm surge flooding from hurricanes, and this example will be discussed. However, it will be apparent to those of skill in the art that modeling of storm surge flooding from hurricanes is just one example of the uses and application of the systems and methods described herein, and other examples will immediately be apparent. For the purpose of illustration, the systems and methods will be described for use in this example. In this example, the modeling process provides estimates of the flood depth for storm surge events, estimates of the insured loss for each event, and estimates of the probabilities of each event by storm category and landfall.

In this example embodiment, the flood depths for various storm surge events are derived from a database constructed by the Federal Emergency Management Agency (FEMA) using the Sea, Lake and Overland Surges from Hurricanes (SLOSH) Model. The methods and systems described herein will perturb those water depths in each event to allow for uncertainty in the flooding for each type of event. The insured loss estimates are constructed using a simplified version of the loss estimation process used by vendor catastrophe models. The event probabilities are assembled from multiple sources, including independent analysis of historical hurricane data and estimates developed from catastrophe model vendors.

Event probabilities, as noted above, can be assembled from any suitable source, such as vendor models that expose the probabilities being used, catalogs of events where one can analyze the frequency with which certain events appear in that database, academic institutions that publish event probability data, government sources and other similar sources. Those of skill in the art will know that these sources are likely to be in different format and have different estimated probabilities for the same events as noted by others. An analysis of the raw data can produce multiple estimates depending on how one treats bypassing weather events, multi-landfalling events and early years in the historical record. There may also be assumptions made about the impact of climate change (which might vary by region) or current state of climatology, for example, the El Niño-Southern Oscillation (ENSO) cycle, on the historical record. There are many known assumptions and analyses that can be performed that will influence event frequency estimates.

FIG. 1 is a flow chart of illustrated steps involved in determining a likelihood of an outcome in accordance with some embodiments of the disclosure. The likelihood of an outcome, in at least one embodiment, is the probability that the outcome will occur. At step 102, process 100 begins by creating a database of events by categorizing a list of measured meteorological events to associate each measured meteorological event with an event type having a geographic region, an intensity, and a hazard. Typically in this example, a measured meteorological event is a weather phenomenon that is able to be studied, such as wind speeds in a tornado, an amount of rainfall from a hurricane, or the height of water from a flood. An event type, typically in this example, is a category of a weather phenomenon, such as a tornado, hurricane, or earthquake. An event type, in at least one embodiment, can be a more specific category of a weather phenomenon, such as a major hurricane, where a major hurricane is defined in the art as a hurricane that reaches category 3, 4, or 5 on the Saffir-Simpson scale. An event type, in at least one embodiment, can also be tied to a specific geographic region. For example, an event type could be a major hurricane in the Southeast region of the United States. In at least one embodiment, a hazard is the danger or risk associated with a meteorological event, such as property damage, loss of life, or water damage.

Continuing with this example, the methods and systems may assemble SLOSH events into a database. SLOSH events may be generated using the SLOSH computer model to run simulations that produces simulated event data. Each event consists of water depths at various geographic coordinates rising to a certain recorded height. The geographic coordinates are typically latitude and longitude coordinates, but square mile regions of a country or any suitable way of identifying location may be used. For example, the system may apply a small adjustment or perturbation to the water depth for each event, to account for the uncertainty in the SLOSH simulation. Each perturbation adjusts the water depth to +/−10% of the original value. The perturbation accounts for the uncertainty in the event intensity, which contributes to the secondary uncertainty for the event. For example, the system may estimate the damage or loss from each SLOSH event and perturbed SLOSH event. The loss calculation in this example may employ a methodology similar to that used in a standard catastrophe model. In that case, the loss calculation is the product of the exposure and the damage at each location in the event. The damage is typically determined by a damage function related to the event intensity. For example, the event intensity may be the water depth. The systems and methods may record and store all of the event losses into a database. In this example, the systems and methods may assign each event to one or two categories and one of six geographic regions. The categories may be hurricane and major hurricane. The geographic regions may be Northeast, MidAtlantic, Southeast, Florida, Gulf, and Texas. This database, for this example, is the event loss database.

At step 104, process 100 generates for a categorized event a statistical distribution representing a range of probabilities that the categorized event will occur during a calendar year. In some embodiments, process 100 may generate a statistical distribution for a categorized event that includes analyzing an event model to determine a probability estimate used in the event model to estimate a probability of occurrence of an event type. Any suitable technique may be used, and in one embodiment the method determines, independently for each class of event, the range of estimates for the frequency of categorized events, identifies the minimum and maximum frequency noted, and samples from a uniform distribution between the identified minimum and maximum. Alternatively, the method may use the estimates and assume a normal distribution, or fit the estimates to another type of distribution, which might vary by region and event type.

The method may also constrain the estimates to meet a countywide estimate or have conditional rules within regions or adjacent regions. For example, the system may create a separate database that contains estimates of the minimum and maximum annual frequency for each of the twelve event types determined by the two categories and six geographic regions. The range of minimum to maximum frequency may be consistent with estimates from various sources, and accounts for the primary uncertainty associated with the occurrence of an event. This separate database may be considered the event frequency database. In some embodiments, the statistical distribution may include a Poisson distribution. Although the above discusses the Poisson distribution, any other suitable technique may be used. For example, negative binomial may be employed. Further, there are variants on Poisson and negative binomial that can be used to add more zero event years, or enforce only non-zero event counts, which may be appropriate depending on the peril estimated by the user, who would be a person of skill in the art.

Process 100 determines a likelihood of an outcome by continuing to step 106. At step 106, process 100 iteratively samples events from the database as a function of the event type, with a sample rate for a respective event type being determined as a function of the statistical distribution. For example, the system may choose the size of the catalog. The size of the catalog represents the length of the simulation in years and the number of catalogs to create. For example, the size of the catalog may be 1,000 catalogs of 10,000 years of simulated hurricane activity. For each of the 1,000 catalogs, the system may sample the annual frequency from the frequency database by randomly selecting a value between the minimum and maximum value for each of the twelve event types. The system may sum the twelve samples to calculate the annual frequency of events for this catalog.

At step 108, process 100 associates with each sampled event an outcome value. For example, the system may simulate 10,000 years of hurricane activity by sampling from a Poisson distribution using the calculated annual frequency of events. The outcome value represents the number of events that will be simulated in each year of the catalog.

At step 110, process 100 sums the outcome values to generate an accumulated outcome value across a plurality of sampled events. In some embodiments, process 100 may generate an accumulated outcome value by summing outcome values across a set of sampled events selected to provide a reliable prediction of the outcome. For example, the system can create the frequency sampling and event sampling tables. The frequency sampling table lists the range of random numbers associated with each event type. The overall list of random numbers ranges from 0 to 1, and the range for each event type corresponds to the proportion of the annual frequency accounted for by that event type. For example, the event year table is constructed by generating a random number for each event, and then sampling from the event frequency table to determine which type of event will be included. One event for each event type selected is drawn sequentially from the event loss database. The loss for each event in the simulated catalog is stored in the results database for later processing.

In some embodiments, process 100 may further determine a likelihood of an outcome by iteratively applying the statistical distribution of probability estimates to alter the sample rate for sampling events for a respective event type from the database. For example, before moving on to the next catalog, the system may reshuffle the order of events in the event loss database to ensure a different sequence of events will be drawn in the next simulation. The process above repeats for each catalog. For example, after 1,000 catalogs have been produced, the system may process the information stored in the results database. For example, for each catalog, the system may calculate the annual occurrence and annual aggregate for each simulated year. The annual occurrence may correspond to the maximum loss. The annual aggregate may correspond to the sum of losses.

In some embodiments, process 100 may generate an exceedance probability curve as a function of the accumulated outcome values. In some embodiments, process 100 may match the exceedance probability curve against an exceedance probability curve generated by a separate event model. For example, the system may sort and rank the losses to determine the annual exceedance probability for the simulated occurrence and aggregate losses. For example, in a 10,000 year simulation, the 0.1% probability of exceedance is the $10^{th}$-ranked loss, the 0.4% probability of occurrence is the $40^{th}$-ranked loss, the 1% probability of exceedance is the $100^{th}$-ranked loss, and so on. These losses correspond to the 1,000-year, 250-year, and 100-year return periods, respectively.

Figure 2:
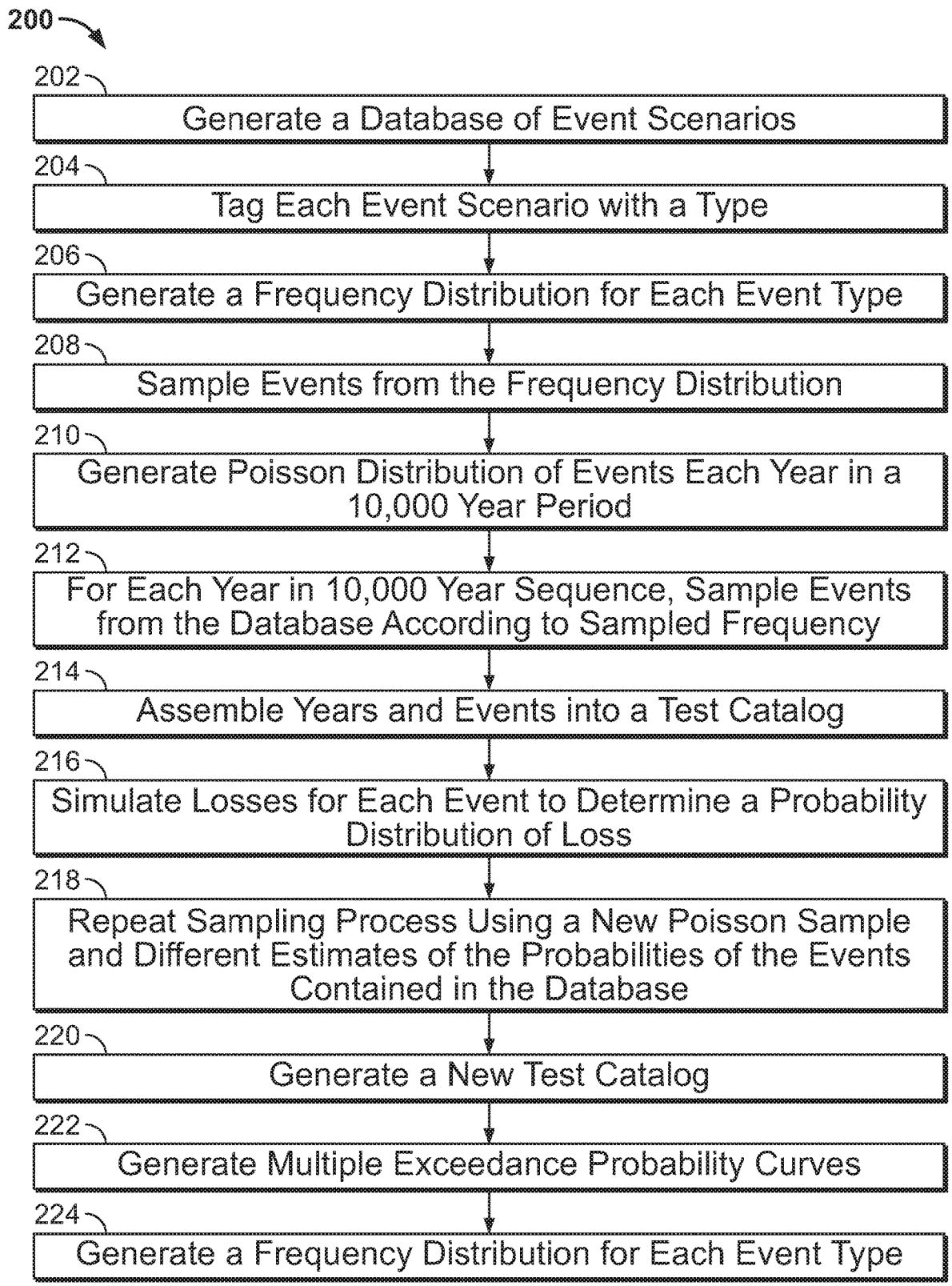
FIG. 2 is a flow chart of illustrated steps involved in determining a likelihood of an outcome in accordance with some embodiments of the disclosure.

FIG. 2 is a flow chart of illustrated steps involved in determining a likelihood of an outcome in accordance with some embodiments of the disclosure. At step 202, process 200 begins by generating a database of event scenarios. For example, the system may assemble SLOSH events into a database. Each event consists of water depths at various geographic coordinates. The geographic coordinates may be latitude and longitude. The geographic coordinates can be in a geographic region. For example, the system may apply a small adjustment or perturbation to the water depth for each event, to account for the uncertainty in the SLOSH simulation. Each perturbation adjusts the water depth to +/−10% of the original value. The perturbation accounts for the uncertainty in the event intensity, which contributes to the secondary uncertainty for the event. For example, the system may estimate the damage or loss from each SLOSH event and perturbed SLOSH event. The loss calculation follows a methodology similar to that used in a standard catastrophe model. The loss calculation is the product of the exposure and the damage at each location in the event. The damage is determined by a damage function related to the event intensity. For example, the event intensity may be the water depth.

At step 204, process 200 tags each event scenario with a type. For example, the system may store all of the event losses into a database. The system may assign each event to one or two categories and one of six geographic regions. The categories may be hurricane and major hurricane. The geographic regions may be Northeast, MidAtlantic, Southeast, Florida, Gulf, and Texas. This database may be considered the event loss database.

At step 206, process 200 generates a frequency distribution for each event type. For example, the system may create a separate database that contains estimates of the minimum and maximum annual frequency for each of the twelve event types determined by the two categories and six geographic regions. The range of minimum to maximum frequency is consistent with estimates from various sources, and accounts for the primary uncertainty associated with the occurrence of an event. This separate database may be considered the event frequency database.

At step 208, process 200 samples events from the frequency distribution. For example, the system may choose the size of the catalog. The size of the catalog represents the length of the simulation in years and the number of catalogs to create. For example, the size of the catalog may be 1,000 catalogs of 10,000 years of simulated hurricane activity. For each of the 1,000 catalogs, the system may sample the annual frequency from the frequency database by randomly selecting a value between the minimum and maximum value for each of the twelve event types. The system may sum the twelve samples to calculate the annual frequency of events for this catalog.

At step 210, process 200 generates Poisson distribution of events each year in a 10,000 year period. For example, the system may simulate 10,000 years of hurricane activity by sampling from a Poisson distribution using the calculated annual frequency of events. The sampled value represents the number of events that will be simulated in each year of the catalog.

At step 212, process 200, for each year in the 10,000 year sequence, samples events from the database according to sampled frequency. For example, the system can create the frequency sampling and event sampling tables. The frequency sampling table lists the range of random numbers associated with each event type. The overall list of random numbers ranges from 0 to 1, and the range for each event type corresponds to the proportion of the annual frequency accounted for by that event type.

At step 214, process 200 assembles years and events into a test catalog. For example, the event year table is constructed by generating a random number for each event, and then sampling from the event frequency table to determine which type of event will be included. A specific event for each event type selected is drawn sequentially from the event loss database.

At step 216, process 200 simulates losses for each event to determine a probability distribution of loss. For example, the loss for each event in the simulated catalog is stored in the results database for later processing.

At step 218, process 200 repeats the sampling process using a new Poisson sample and different estimates of the probabilities of the events contained in the database. For example, before moving on to the next catalog, the system may re-shuffle the order of events in the event loss database to ensure a different sequence of events will be drawn in the next simulation. The process above repeats for each catalog.

At step 220, process 200 generates a new test catalog. For example, after 1,000 catalogs have been produced, the system may process the information stored in the results database. For example, for each catalog, the system may calculate the annual occurrence and annual aggregate for each simulated year. The annual occurrence may correspond to the maximum loss. The annual aggregate may correspond to the sum of losses.

At step 222, process 200 generates multiple exceedance probability curves. For example, the system may sort and rank the losses to determine the annual exceedance probability for the simulated occurrence and aggregate losses. For example, in a 10,000 year simulation, the 0.1% probability of exceedance is the $10^{th}$-ranked loss, the 0.4% probability of exceedance is the $40^{th}$-ranked loss, the 1% probability of exceedance is the $100^{th}$-ranked loss, and so on. These losses correspond to the 1,000-year, 250-year, and 100-year return periods, respectively.

At step 224, process 200 generates a frequency distribution for each event type. For example, by regenerating the catalog 1,000 times, there are now 1,000 separate estimates of the loss for each exceedance probability or return period. The distribution of estimates allows us to quantify the impact of the primary uncertainty on the loss estimates, which is an improvement over the single exceedance probability curve provided by a vendor catastrophe model.

Using process 200, an engineer or scientist can evaluate a catastrophe model to assess the uncertainty in the model, such as the uncertainty arising from assumptions made regarding the historical data used to set probabilities of certain outcomes, such as a major hurricane in a region. The process 200 can create a database of events by categorizing a list of measured meteorological events to associate each measured meteorological event with an event type having a geographic region, an intensity, and a hazard. The process 200 can generate for a categorized event a statistical distribution representing a range of probabilities that the categorized event will occur during a calendar year. The process 200 may then determine a likelihood of an outcome by iteratively sampling events from the database as a function of the event type, with a sample rate for a respective event type being determined as a function of the statistical distribution, and associating with each sampled event an outcome value and summing the outcome values to generate an accumulated outcome value across a plurality of sampled events.

Process 100 and 200 described herein can be realized as a computer program that processes data and stores the data in database systems. For example, process 100 and 200 described herein can be realized as a software component operating on a data processing system suitable for numerical analysis, such as a Unix workstation, and may include processors for high-performance computing, such as the HPC systems manufactured and sold by Dell computing of Austin Tex. In that embodiment, the computer model analyzer can be implemented as a C language computer program, or a computer program written in another suitable level language including C++, Fortran, Java, Python or R. Additionally, in an embodiment where digital signal processors are employed, the computer model analyzer can be realized as a computer program written in microcode or written in a high-level language and compiled down to microcode that can be executed on the platform employed. The development of such computer model analyzers is known to those of skill in the art. Additionally, general techniques for high-level programming are known, and set forth in, for example, Stephen G. Kochan, Programming in C, Hayden Publishing (1983).

Figure 3:
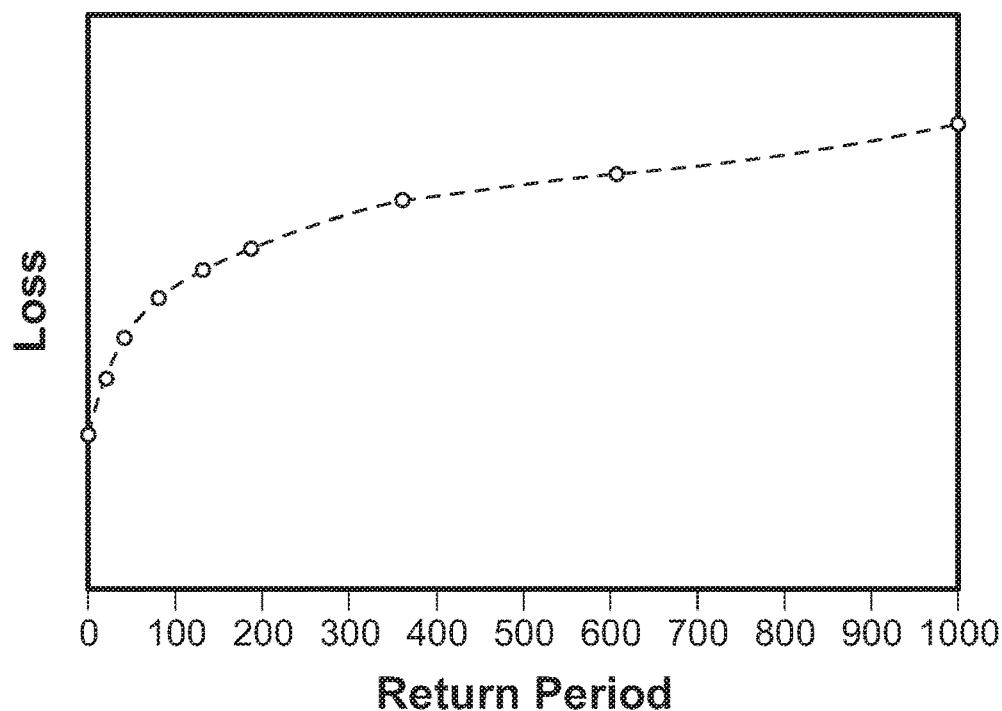
FIG. 3 depicts a graph of a vendor model curve in accordance with some embodiments of the disclosure.

FIG. 3 depicts a graph 300 of a vendor model curve in accordance with some embodiments of the disclosure. The x-axis shows the return period, measured in years. The y-axis shows the loss at that return period. The vendor model curve shown here is an exceedance probability curve. The curve generally shows that as the return period increases, the loss increases. The tangential slope of the curve decreases as the return period increases. For example, the difference in loss between zero- and 100-year return periods is larger than the difference in loss between 900- and 1,000-year return periods.

The standard commercially available catastrophe output provides a single exceedance probability curve, such as that depicted in FIG. 3. For example, at the 500-year return period, 0.2% probability of exceedance, the result is a single loss value. By providing just one curve, the user cannot estimate the impact of alternative frequency and severity assumptions on the modeled loss estimate. Alternative frequency and severity assumptions are equally credible catalog of events.

Figure 4:
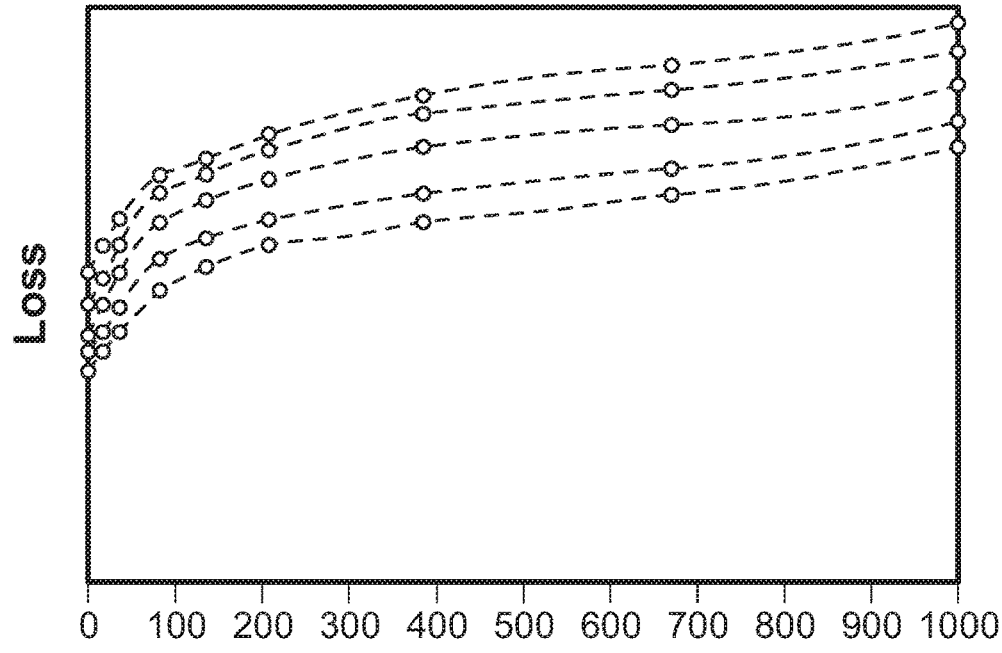
FIG. 4 depicts a graph of technical solution curves in accordance with some embodiments of the disclosure.

FIG. 4 depicts a graph 400 of technical solution curves in accordance with some embodiments of the disclosure. The x-axis shows the return period, measured in years. The y-axis shows the loss at that return period. The technical solution curves shown here are exceedance probability curves. For each curve, as the return period increases, the loss increases. The tangential slope of the curve decreases as the return period increases. For example, the difference in loss between zero and 100-year return periods is larger than the difference in loss between 900- and 1,000-year return periods.

The methods described by processes 100 and 200 produce a separate exceedance probability curve for each catalog run, which incorporates both primary uncertainty, by varying frequency and severity, and secondary uncertainty, by perturbing the flood depth. Each catalog run is represented by a separate curve in FIG. 4. The distribution of loss values at each return period described by graph 400 provides a more robust estimate from the model.

Figure 5:
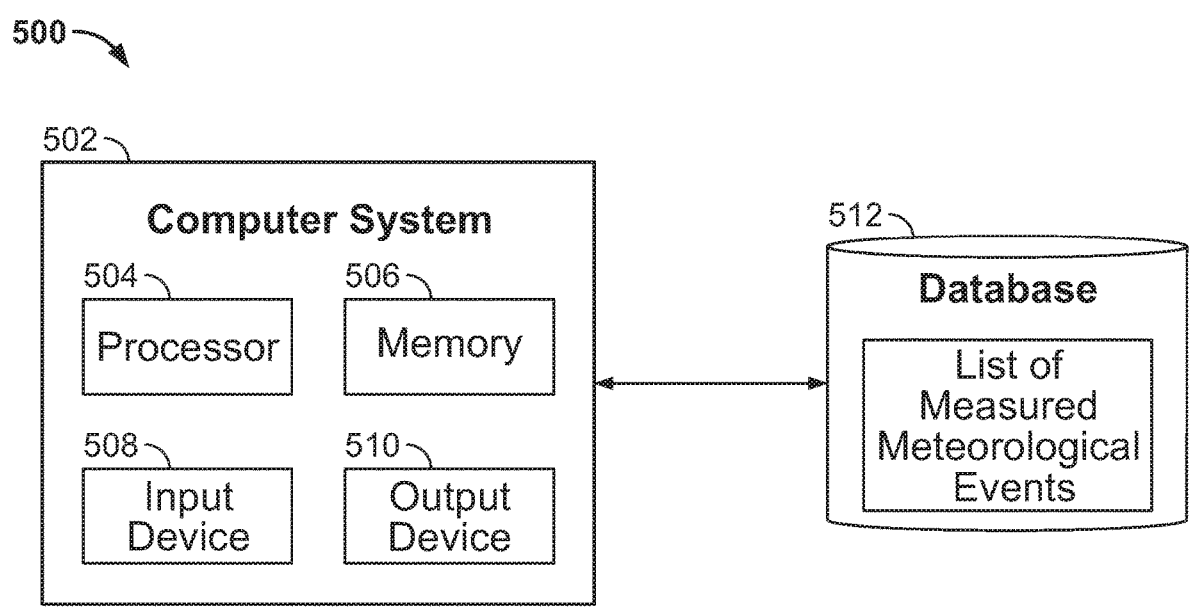
FIG. 5 is a block diagram illustrating a database in communication with a computer system.

FIG. 5 depicts a system 500 to assess uncertainty in catastrophe models that comprises a computer system 502 and database 512 for supporting a system as described herein. The computer system 502 can include, for example, a processor 504, storage medium 506, an input device 508, and an output device 510. The database 512 can include, for example, a list of meteorological events 514.

The depicted computer system 502 can be a conventional computer platform such as an IBM PC-compatible computer running the Windows operating systems, or a SUN workstation running a Unix operating system. Alternatively, the computer system 502 can comprise a dedicated processing system that includes an embedded programmable data processing system that can include, for example, the mechanism for generating the statistical distribution described herein. For example, the computer system can comprise a single board computer system that has been integrated into a system for evaluating a catastrophe model. The single board computer (SBC) system can be any suitable SBC, including the SBCs sold by the Micro/Sys Company, which include microprocessors, data memory and program memory, as well as expandable bus configurations and an on-board operating system.

Accordingly, although FIG. 5 graphically depicts the computer system 502 and the database 512 as functional block elements, it will be apparent to one of ordinary skill in the art that these elements can be realized as computer programs or portions of computer programs that are capable of running on the processor 504 to thereby configure the processor 504 as a system according to the invention. Moreover, although FIG. 5 depicts the system 500 as an integrated unit of a computer system 502 that couples to a database 512, it will be apparent to those of ordinary skill in the art that this is only one embodiment, and that the invention can be embodied as a computer program that can process or operate on a database that includes meteorological events. Accordingly, it is not necessary that the computer system 502 be directly coupled to the database 512, and instead the database 512 can be imported into the computer system 502 by any suitable technique, including by file transfer over a computer network, or by storing the image file on a disk and mounting or copying the disk into the file system of the computer system 502. Thus it will be apparent that the database 512 can be remote from the computer system 502.

The depicted database 512 can be any suitable database system, including the commercially available Microsoft Access database, and can be a local or distributed database system. The design and development of suitable database systems are described in McGoveran et al., A Guide to Sybase and SQL Server, Addison-Wesley (1993). The database 512 can be supported by any suitable persistent data memory, such as a hard disk drive, RAID system, tape drive system, floppy diskette, or any other suitable system. The system depicted in FIG. 5 includes a database 512 that is separate from the computer system 502; however, it will be understood by those of ordinary skill in the art that in other embodiments the database device 512 can be integrated into the system 502.

Figure 6:
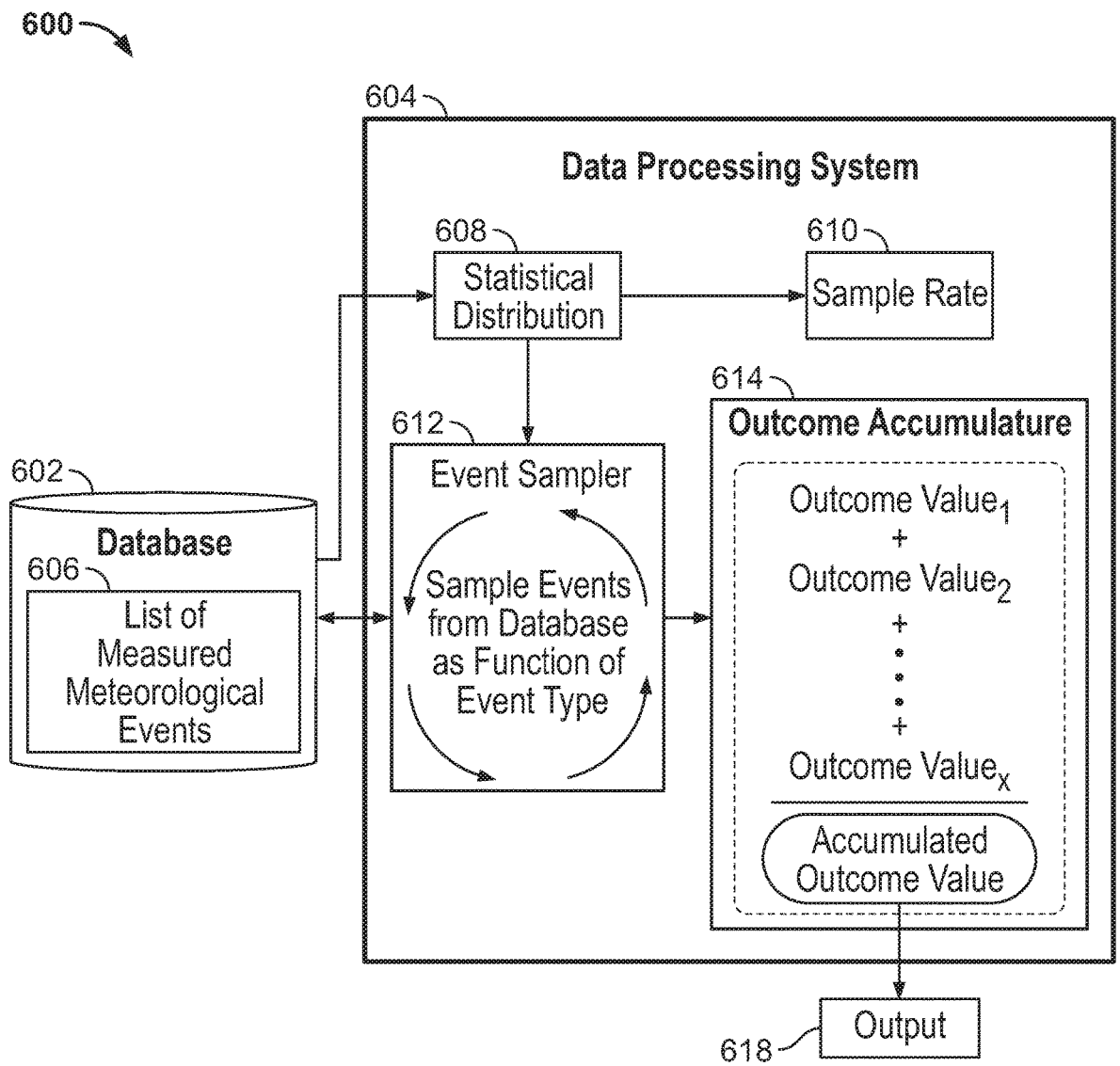
FIG. 6 is a block diagram illustrating a database in communication with a data processing system.

FIG. 6 depicts a block diagram 600 with database 602 and data processing system 604. Database 602 contains, for example, a list of measured meteorological events. This list is categorized by event type. Examples of event types include tornadoes, earthquakes, and hurricanes. Each event is associated with a geographic region, an intensity, and a hazard.

Database 602 can be accessed by data processing unit 604. This access could, be granted through an input device such as that shown in FIG. 5 at 508. For each categorized event that is accessed by the data processing system, a statistical distribution 608 is generated. This distribution can represent a range of probabilities that the event will occur during a calendar year. A sample rate 610 can be determined for the event's event type as a function of the statistical distribution 608. The sample rate 610 can then be used when sampling events from the database 602. Events of the same event type as that originally input into the statistical distribution 608 are iteratively sampled at event sampler 612. Each event that is iteratively sampled at event sampler 612 can be associated with an outcome value 614. The outcome value can be, for example, the annual frequency of a certain event type. The outcome values can be summed to form an accumulated outcome value 616. The accumulated outcome value can be output 618, using an output device such as that shown in FIG. 5 at output device 510. The accumulated outcome value can represent the total annual frequency of meteorological events.

Figure 7:
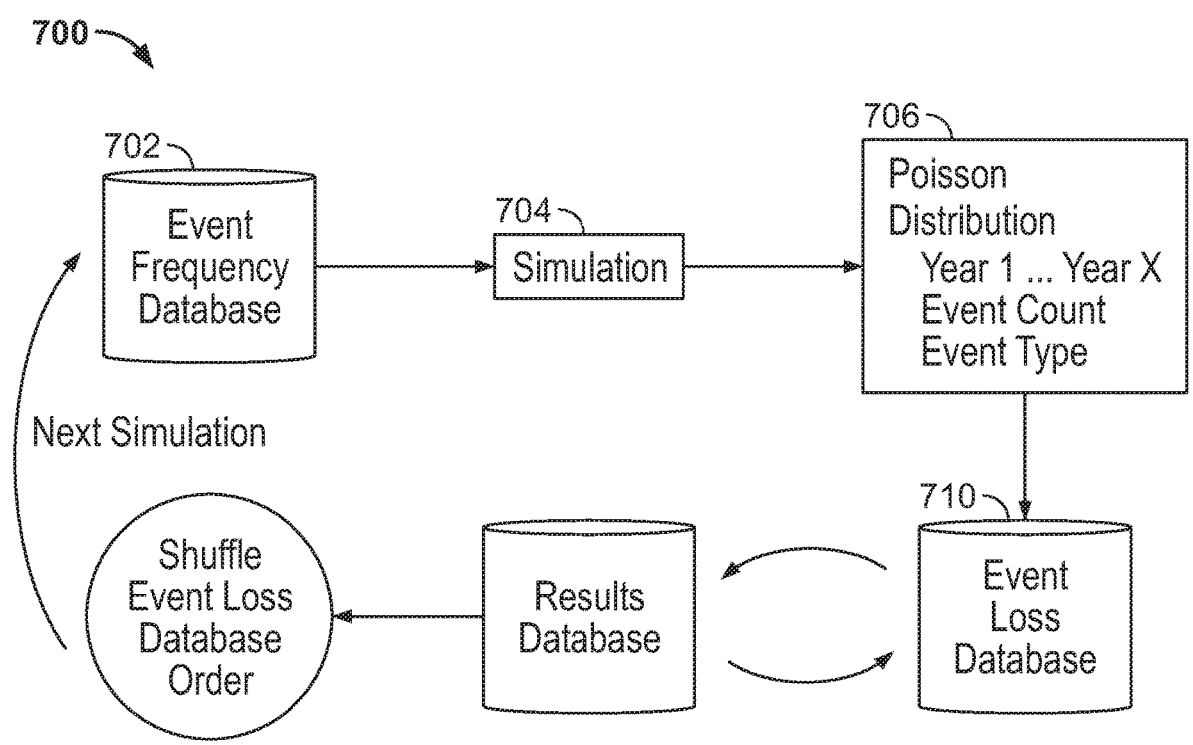
FIG. 7 is a block diagram illustrating a system for assessing uncertainty in a model in accordance with some embodiments of the disclosure.

FIG. 7 depicts a block diagram 700 representing a system and method to assess uncertainty in a catastrophe model. Uncertainty can be assessed by using a series of simulations that catalog results of a model. To start the first simulation, the annual frequency for each event type can be randomly sampled from the event frequency database 702. The event frequency database can list, for example, the minimum and maximum event frequency for event types. After randomly sampling the annual frequency for each event type from database 702, the resulting output values can be summed to calculate the annual frequency of events. Meteorological event activity can then be simulated 704 over periods of time and can be used to create a catalog of events. This simulation can be done by sampling from a Poisson distribution 706 using the calculated annual frequency. This provides the number of events per year. Based on the annual frequency of a certain event type, event types that are included each year can then be determined by randomly sampling again. Therefore, for year one to year X, where year X is the end point of simulation, an event count and event type can be provided.

For example, once a Poisson distribution 706 is known, event losses can be determined and used to populate event loss database 710. For each event type selected in the simulation 704, a specific event loss corresponding to the event type can then be sequentially drawn from the event loss database 710. The year, the event, and the loss associated with that event in the simulation 704 can then be stored in results database 712. After all selected event types have stored at least one event loss and its corresponding information in event loss database 712, the order of event losses in the event loss database 710 could be shuffled 714. Shuffling 714 the event loss database 710 ensures a unique sequence of events will be drawn for the next simulation that can be started again at event frequency database 702. Each simulation can be used to create a separate exceedance probability curve, as described above.

Figure 8:
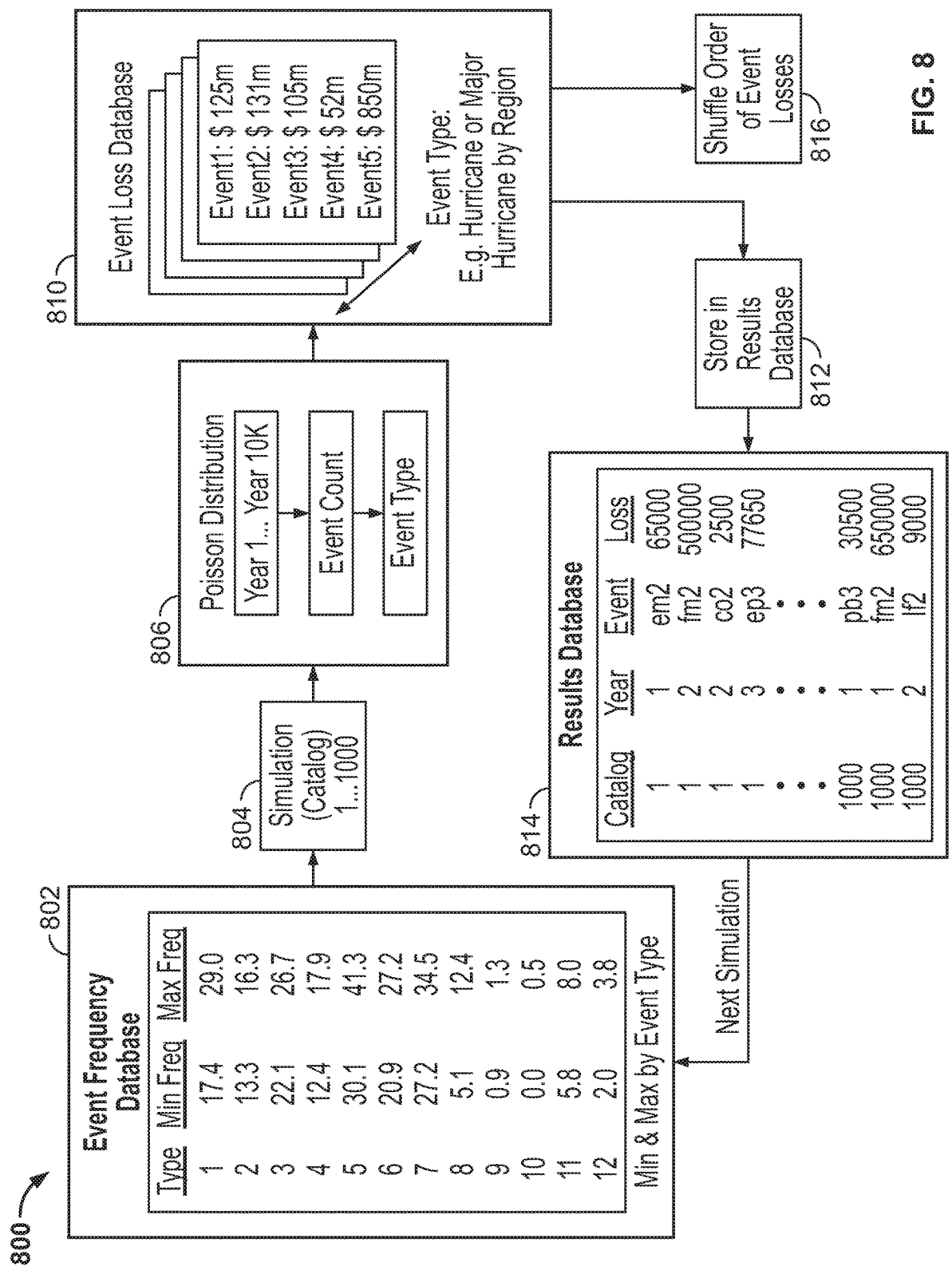
FIG. 8 is a block diagram representing a system to assess uncertainty in a catastrophe model for a set number of simulations in accordance with some embodiments of the disclosure.

FIG. 8 depicts a block diagram 800 representing an embodiment of a system to assess uncertainty in a catastrophe model. Uncertainty can be assessed by using a series of simulations that catalog results of a model. An annual frequency for each event type of a group of event types is randomly sampled from the event frequency database 802. The event frequency database 802 depicts a list of the minimum and maximum event frequency for each event type of twelve event types. For a simulation, after randomly sampling the annual frequency for each event type from event frequency database 802, the resulting output values can be summed to calculate the annual frequency of events. Meteorological event activity can then be simulated 804 over periods of time and used to create a catalog of events. In the depicted embodiment 800, one thousand (1,000) catalogs of events are built through separate simulations. Each simulation samples from a Poisson distribution 806 using the calculated annual frequency. Sampling the Poisson distribution 806 provides the number of events (event count) per year for a number of years. In this embodiment, 10,000 years of activity are simulated. Based on the annual frequency of a certain event type, event types that are included each year can then be determined by randomly sampling. Therefore, for year one to year 10,000 of a certain simulation, an event count, and an event type for each event of the event count, can be provided for each year.

Once the event counts and event types are known, event losses are determined and used to populate event loss database 810. The event loss database 810 contains event losses categorized by event type. For example, the event types depicted here can include hurricanes and major hurricanes in different regions. In this embodiment, event losses are monetary losses for a specific event. For example, Event 1 is associated with a loss of $125 million. Events 1, 2, 3, 4, and 5 as shown in the event loss database 810 are of the same event type. This event type could be, for example, a major hurricane in the Southeast region of the United States. Other events can be of different event types, such as a hurricane in the MidAtlantic region of the United States.

For each event type selected in the simulation 804, a specific event loss corresponding to the event type is sequentially drawn from the event loss database 810. The year, the event, and the loss associated with that event in the simulation 804 can then be stored 812 in results database 814. For example, as depicted in results database 814, for event em2, the results database would store that the event em2 is associated with catalog 1, year 1 and has a loss of $65,000.

Before the next simulation is started by again sampling from event frequency database 802, the order of event losses in the event loss database 810 is shuffled 816. Shuffling 816 the event loss database 810 ensures a unique sequence of events will be drawn for the next simulation that can be started again by sampling from event frequency database 802. Each simulation catalog of the 1,000 simulation catalogs has 10,000 years of events. Each year of the 10,000 years has an associated event count. Therefore, by the end of the 1,000 simulations, each catalog of the 1,000 catalogs contains 10,000 years of simulated event activity. Each simulation catalog can be used to create a separate exceedance probability curve, as described above.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As discussed above, the system for assessing uncertainty in catastrophe models can be realized as a software component operating on a conventional computer system such as a Unix workstation. In that embodiment, the mechanism for assessing uncertainty in catastrophe models can be implemented as a C language computer program, or a computer program written in any high-level language including C++, Fortran, Java or basic. Additionally, in an embodiment where microcontrollers or DSPs are employed, the mechanism for assessing uncertainty in catastrophe models can be realized as a computer program written in microcode or written in a high-level language and compiled down to microcode that can be executed on the platform employed. The method of developing catastrophe models is known to those of skill in the art. Developing code for the DSP and microcontroller systems follows from principles well known in the art.

Some embodiments of the above-described systems and methods may be implemented by the preparation of application-specific integrated circuits (ASIC) or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Those skilled in the art will know or be able to ascertain, using no more than routine experimentation, many equivalents to the embodiments and practices described herein. For example, the technical processes and computational model analyses described herein can be applied to quantify the uncertainty of other models. It will also be understood that the systems and methods described herein provide advantages over the prior art by, for example, including the ability to quantify the impact of uncertainty on loss estimates.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module, or software layer described herein, may be embodied directly in hardware, or embodied as software executed by a processor, or embodied as a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

From the above description it is manifest that various techniques may be used for implementing the concepts described herein without departing from the scope of the disclosure. The described embodiments are to be considered in all respects as illustrative and not restrictive. It should also be understood that the techniques and structures described herein are not limited to the particular examples described herein, but can be implemented in other examples without departing from the scope of the disclosure. Similarly, while operations are depicted in the drawings in a particular order, this should not be understood as requiring that such operations be performed in the particular order shown or in sequential order, or that all illustrated operations be performed, to achieve desirable results. Additionally, the different examples described are not singular examples, and features from one example may be included within the other disclosed examples. Accordingly, it will be understood that the claims are not to be limited to the examples disclosed herein, but are to be understood from the technical teachings provided above, as those teachings will inform the person of skill in the art.

What is claimed is:

1. A method for evaluating an impact of primary certainty on loss estimates associated with a given event scenario, comprising:
   categorizing a list of measured meteorological events in a database of measured meteorological events by associating a measured meteorological event with an event type of a plurality of event types, wherein each event type comprises a unique combination of a geographic region of a plurality of geographic regions, an intensity of a plurality of intensities, and a hazard of a plurality of hazards, and wherein each measured meteorological event is associated with the given event scenario and a loss value;
   generating, for each event type of the plurality of event types, a statistical distribution representing a range of probabilities that the event type will occur during a calendar year to provide a plurality of statistical distributions, each statistical distribution of the plurality of statistical distributions comprising a plurality of data points each comprising a frequency estimate associated with the event type, wherein the range comprises a minimum frequency and a maximum frequency;
   generating a plurality of test catalogs, each test catalog comprising a catalog size, wherein generating a test catalog comprises:
       sampling a data point from each statistical distribution of the plurality of statistical distributions to produce a plurality of data points; and
       generating an accumulated frequency value based at least in part on summing all frequency estimates associated with each data point of the plurality of data points; and
       according to the catalog size and the accumulated frequency value, retrieving a loss value associated with a measured meteorological event associated with each event type of the test catalog; and
   based at least in part on the plurality of test catalogs, generating a plurality of exceedance probability curves, the plurality of exceedance probability curves comprising a unique frequency distribution for each event type of a plurality of event types.

2. The method of claim 1, wherein a test catalog size comprises a length of a simulation in years.

3. The method of claim 1, wherein the plurality of test catalogs is generated according to a predetermined number of test catalogs.

4. The method of claim 1, further comprising presenting the plurality of frequency distributions via a user interface.

5. The method of claim 1, wherein the statistical distribution comprises a Poisson distribution.

6. The method of claim 1, wherein generating an exceedance probability curve for an event type comprises generating an exceedance probability curve as a function of the loss value associated with the event type.

7. The method of claim 6, further comprising matching the exceedance probability curve against an exceedance probability curve generated by a separate event model.

8. The method of claim 7, further comprising:
   determining, based at least in part on matching the exceedance probability curve against the exceedance probability curve generated by the separate event model, an uncertainty; and
   outputting the uncertainty as an evaluation of the separate event model.

9. A system for evaluating a catastrophe model, comprising one or more computer systems each having access to at least one database and configured to:
   categorize a list of measured meteorological events in a database of measured meteorological events by associating a measured meteorological event with an event type of a plurality of event types, wherein each event type comprises a unique combination of a geographic region of a plurality of geographic regions, an intensity of a plurality of intensities, and a hazard of a plurality of hazards, and wherein each measured meteorological event is associated with the given event scenario and a loss value;
   generate, for each event type of the plurality of event types, a statistical distribution representing a range of probabilities that the event type will occur during a calendar year to provide a plurality of statistical distributions, each statistical distribution of the plurality of statistical distributions comprising a plurality of data points each comprising a frequency estimate associated with the event type, wherein the range comprises a minimum frequency and a maximum frequency;
   generate a plurality of test catalogs, each test catalog comprising a catalog size, wherein generating a test catalog comprises:
       sampling a data point from each statistical distribution of the plurality of statistical distributions to produce a plurality of data points; and generating an accumulated frequency value based at least in part on summing all frequency estimates associated with each data point of the plurality of data points; and according to the catalog size and the accumulated frequency value, retrieving a loss value associated with a measured meteorological event associated with each event type of the test catalog; and based at least in part on the plurality of test catalogs, generating a plurality of exceedance probability curves, the plurality of exceedance probability curves comprising a unique frequency distribution for each event type of a plurality of event types.

10. The system of claim 9, wherein a test catalog size comprises a length of a simulation in years.

11. The system of claim 9, wherein the plurality of test catalogs is generated according to a predetermined number of test catalogs.

12. The system of claim 9, wherein the one or more computer systems are further configured to present the plurality of frequency distributions via a user interface.

13. The system of claim 9, wherein the statistical distribution comprises a Poisson distribution.

14. The system of claim 9 wherein the one or more computer systems are further configured to generate an exceedance probability curve as a function of the loss value associated with the event type.

15. The system of claim 14, wherein the one or more computer systems are further configured to match the exceedance probability curve against an exceedance probability curve generated by a separate event model.

16. The system of claim 15, wherein the one or more computer systems are further configured to:

determine, based at least in part on matching the exceedance probability curve against the exceedance probability curve generated by the separate event model, an uncertainty; and output the uncertainty as an evaluation of the separate event model.

* * * * *